(12) United States Patent
Venkatesh (10) Patent No.: US 10,623,454 B2
(45) Date of Patent: Apr. 14, 2020

(54) SYSTEM AND METHOD FOR MULTIMEDIA REDIRECTION FOR CLOUD DESKTOP CONFERENCING

(71) Applicant: Dell Products L.P., Round Rock, TX (US)

(72) Inventor: Ramanujam Kaniyar Venkatesh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 457 days.

(21) Appl. No.: 14/881,515

(22) Filed: Oct. 13, 2015

(65) Prior Publication Data
US 2017/0104797 A1    Apr. 13, 2017

(51) Int. Cl.
| | | |
|---|---|---|
| *H04L 29/06* | (2006.01) | |
| *H04L 29/08* | (2006.01) | |
| *H04L 12/18* | (2006.01) | |
| *H04N 7/15* | (2006.01) | |
| *H04N 7/14* | (2006.01) | |

(52) U.S. Cl.
CPC ........ *H04L 65/403* (2013.01); *H04L 65/1069* (2013.01); *H04L 65/60* (2013.01); *H04L 65/605* (2013.01); *H04L 67/2814* (2013.01); *H04L 12/1813* (2013.01); *H04L 12/1827* (2013.01); *H04N 7/142* (2013.01); *H04N 7/147* (2013.01); *H04N 7/152* (2013.01)

(58) Field of Classification Search
CPC .......... H04L 65/607; H04L 2012/6483; H04N 21/4363; H04N 21/42615; H04N 21/4341; H04N 21/4344
See application file for complete search history.

(56) References Cited

U.S. PATENT DOCUMENTS

| | | | | |
|---|---|---|---|---|
| 2002/0112244 | A1* | 8/2002 | Liou | H04L 12/1827 725/93 |
| 2002/0146233 | A1* | 10/2002 | Barton | G11B 27/002 386/214 |
| 2003/0158957 | A1* | 8/2003 | Abdolsalehi | H04L 12/1813 709/231 |
| 2005/0213593 | A1* | 9/2005 | Anderson | H04L 29/06027 370/419 |
| 2007/0058647 | A1* | 3/2007 | Bettis | H04L 47/10 370/401 |
| 2008/0155591 | A1* | 6/2008 | Mahajan | G06Q 30/02 725/34 |
| 2010/0267332 | A1* | 10/2010 | Lui | H04N 5/775 455/3.06 |

(Continued)

*Primary Examiner* — Barbara B Anyan
(74) *Attorney, Agent, or Firm* — Baker Botts L.L.P.

(57) ABSTRACT

In certain information handling system environments, remote conferencing may require the transmission of multi-media content. The server may query a client that has joined the remote conference to determine if the client supports the encoding format of the multi-media content. A source filter may load the requested multi-media content whereupon the multi-media content is split into audio content and video content by a demultiplexor and then transmitted via a multi-media redirection multiplier filter to a proxy client of each client joined to the remote conference or only selected clients. The multi-media content is processed and decoded at the client system using local hardware at the client thereby offloading demand on the server to the client.

20 Claims, 6 Drawing Sheets

(56) References Cited

U.S. PATENT DOCUMENTS

| | | | | |
|---|---|---|---|---|
| 2010/0332565 A1* | 12/2010 | Al-Shaykh | H04N 7/163 | 707/912 |
| 2011/0018959 A1* | 1/2011 | Friel | H04N 7/142 | 348/14.08 |
| 2012/0182384 A1* | 7/2012 | Anderson | H04L 12/1827 | 348/14.09 |
| 2013/0147900 A1* | 6/2013 | Weiser | H04N 7/152 | 348/14.08 |
| 2013/0152153 A1* | 6/2013 | Weiser | H04L 63/0236 | 726/1 |
| 2013/0314491 A1* | 11/2013 | Vivekanandan | H04M 3/567 | 348/14.08 |
| 2015/0067054 A1* | 3/2015 | Yoo | H04L 65/60 | 709/204 |
| 2015/0172598 A1* | 6/2015 | Suman | H04N 7/147 | 348/14.12 |

* cited by examiner

SYSTEM AND METHOD FOR MULTIMEDIA REDIRECTION FOR CLOUD DESKTOP CONFERENCING

TECHNICAL FIELD

This disclosure generally relates to multi-media redirection, and in particular to multi-media redirection for conferencing software in an enterprise network.

BACKGROUND

As the value and use of information continues to increase, individuals and businesses seek additional ways to process and store information. One option available to these users is an information handling system or computing system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems. The software components may comprise one or more modules that contain instructions that when executed perform one or more functions.

The information handling system may include one or more operating systems. An operating system serves many functions, such as controlling access to hardware resources and controlling the execution of application software. Operating systems also provide resources and services to support application software. These resources and services may include a file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

Some information handling systems are designed to interact with other information handling systems over a network connection. In some instances, the information handling systems may share resources over the network. Certain of the networked information handling systems may act as servers, while others act as clients. In such systems, client applications and client devices may be designed so that the majority of the heavily used resources are at a shared information handling system, such as a centralized server. The client devices may have minimal memory, disk storage, and processor power. Use of such client devices may reduce the total cost of ownership because of the reduced use of resources at the client devices and because the clients can be centrally administered and updated from the server. Such client devices may be particularly well-suited for a network which can handle a significant number of devices.

Virtual desktop infrastructure (VDI) environments may include any one or more information handling systems. A virtual environment, such as a VDI, separates a desktop environment and its associated software in a data center or server, from the information handling system that is used to access the desktop environment. A "virtual desktop" may refer to any number of methodologies including server-based computing (SBC) where a number of users share the desktop of a server-based operating system, VDI where each user gets their own virtual machine which typically runs a client operating system, and application virtualization technologies that concentrate more closely on making specific applications available to users with these applications, for example, being hosted on a remote system or streamed to the user's local system. With respect to the virtual desktop technologies described, SBC is often regarded as being appropriate for task/call-center type environments, while VDI is more commonly deployed for knowledge workers who require a higher level of user personalization, and application virtualization technologies may be commonly deployed across SBC, VDI and physical desktop environments to solve business challenges such as legacy application OS compatibility.

Conferencing software that permits remote users to communicate with one another may be hosted on a cloud desktop of a VDI and remote desktop session host (RDSH) infrastructure. Unified computing systems such as Cisco Unified Computing System (UCS) and Microsoft Lync, CITRIX GoToMeeting, Avaya IP office, Alcatel Open-Touch, and others along with web conferencing software such as Team-Viewer, CISCO WEBEX, GoToAssist, LogMeIn, BOMGAR, N24 and others provide users with a way to interact with each other over an enterprise network. For example, users remote from each other may collaborate for online meetings, presentations, training sessions, etc.

Some online collaborations may require a presentation or material that includes multi-media. For example, during a remote training session hosted from a cloud server, a video that includes audio may be transmitted to each user or participant in the remote training session. However, the host server may take a performance hit when presenting such multi-media to the shared desktops of the various users remotely attending the conference or the online collaboration. Also, when a desktop is shared no remote desktop protocol is available and thus multi-media redirection will not function. The present disclosure addresses this issue.

SUMMARY

In one or more embodiments a method may comprise hosting a remote conference at a server where the conference is hosted utilizing one or more applications at the server. The one or more applications may be local to the server or remote to the server. The server may receive a request from a client to establish one or more communications channels between the server and the client and at least one of the one or more communications channels are established to allow for the client to join the hosted conference. An application at the server may request that certain multi-media content be present to a client that has joined the conference. The requested multi-media content is loaded by a source filter at the server. The loaded multi-media content is sent to a demultiplexor which splits the multi-media content into at least one of audio content and video content. In one embodiment, the demultiplexor comprises a stream splitter. The split multi-media content, the at least one audio content and video content, is redirected to the client via a multi-media redirection multiplier filter. The server may also need to send one or more playback controls to the client via at least one of the one or more communications channels.

In one embodiment, the one or more communications channels comprise at least one of a media channel, a control channel and a feedback channel. In one embodiment, the playback controls or one or more control parameters sent to the client are sent via the control channel. In one embodiment, one or more parameters are received from the client and the server adjusts transmission of the multi-media content, the at least one audio content and video content, to the client based, at least in part, on the one or more parameters. For example, the one or more parameters may be indicative of network bandwidth. In one embodiment, one or more feedback parameters from the client are received at the server via a feedback channel. The server may drop one or more packets associated the multi-media content, the at least one of audio content and video contents, to the client based, at least in part, on the one or more feedback parameters. The server may In one embodiment, the multi-media content is sent from the server to the client via a media channel.

In one embodiment, a system comprises a server, one or more processors for processing information of the server, a memory of the server communicatively coupled to the one or more processors, and one or more modules that comprise instructions stored in the memory, the instructions, when executed by the one or more processor, operable to perform operations for any one or more embodiments of the present disclosure.

In one embodiment, one or more computer-readable non-transitory storage media embodying software operable when executed by one or more information handling systems to perform any one or more embodiments of the present disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DESCRIPTION

This disclosure generally relates to multi-media redirection and, in particular, relates to multi-media redirection for cloud desktop conferencing such as unified communications software (UCS) and web conferencing. Multi-media redirection redirects the multi-media encoded stream directly from a server to one or more client computers. The multi-media stream is processed and decoded at the client. Local client hardware decodes the multi-media stream and presents the decoded multi-media stream content to a user interface at the client, thereby offloading the demand on the server to the client which makes the server more scalable, reduces network traffic, and provides for smooth playback of the multi-media content.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

For the purposes of this disclosure, computer-readable storage media may include any instrumentality or aggregation of instrumentalities that may retain data and/or instructions for a period of time. Computer-readable storage media may include, for example without limitation, storage media such as a direct access storage device (for example, a hard disk drive or floppy disk), a sequential access storage device (for example, a tape disk drive), compact disk, compact disk read-only memory (CD-ROM), digital video disc (DVD), random access memory (RAM), ROM, electrically erasable programmable read-only memory (EEPROM), and/or flash memory.

As used herein, a "local" device of a system, or a device "locally" connected to a system, may be a device directly connected to the system using one or more wires or connectors (for example, physically connected to the system), a device indirectly connected to the system using one or more hubs, or a device directly connected to the system using a wireless link. Furthermore, in one aspect of the present disclosure, a local device of a system or a device locally connected to a system may include a device within the system (for example, an internal device).

The present disclosure is now described in detail with reference to a few embodiments thereof as illustrated in the accompanying drawings. In the following description, numerous specific details are set forth in order to provide a thorough understanding of the present disclosure. However, the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

In systems based on the server/client model, certain resources may be shared amongst clients or between clients and servers via a network. For example, in one embodiment the network is a WAN or a LAN. In some circumstances, it may be advantageous to make peripheral devices connected locally at one client device available to one or more other information handling systems on the network.

One type of client information handling system may be a thin client, also known as a lean or slim client. A thin client is a computer or computer program which depends on some other computer, for example, a server, to fulfill at least some of the computational roles required of the thin client. In certain configurations of one or more information handling systems, multiple user may login to the same server. The users may be permitted to work simultaneously even though they may be physically located at separate locations. According to the present disclosure, the users may be permitted to simultaneously access data, applications, and/or hardware associated with the server (or other information handling system). The server itself may be a physical machine or a virtual machine (VM).

Figure 1:
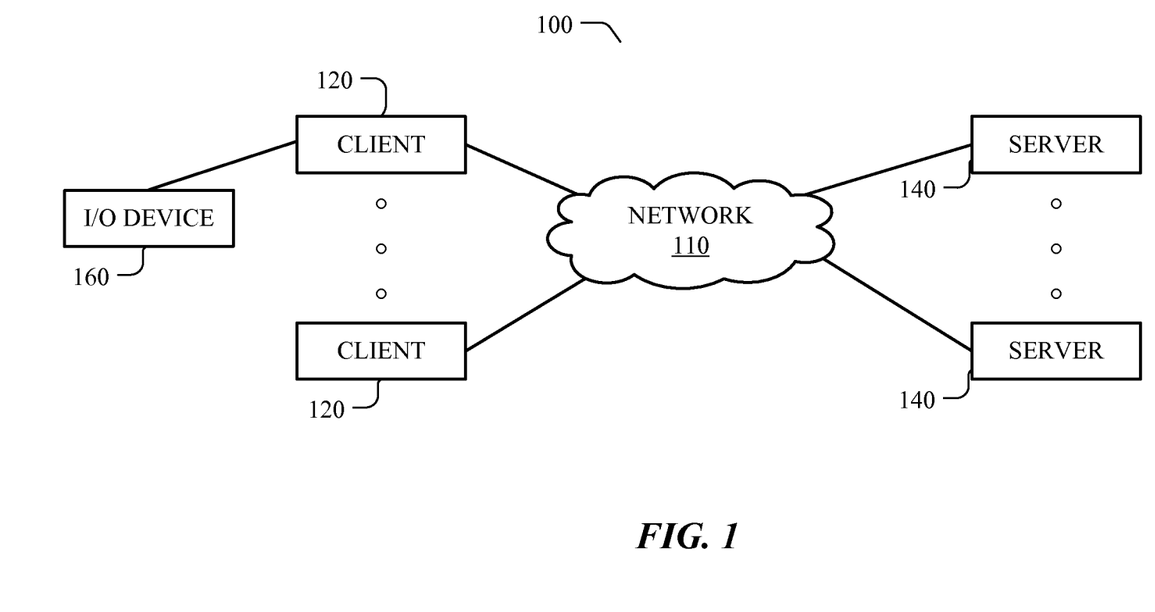
FIG. 1 illustrates an example configuration of networked information handling systems according to one embodiment of the present disclosure.

FIG. 1 at 100 illustrates an example configuration of a networked information handling system. In particular embodiments, one or more client 120 and one or more servers 140 are connected via network 110. Client 120 may be thin-clients, WebEx clients, or any other type of information handling system as described with respect to FIG. 6. Many types of peripheral devices may be connected locally to the client 120. As shown in FIG. 1, in some embodiments, one or more I/O devices 160 connect to client 120. A client 120 may be connected or coupled to any number of I/O devices 160. I/O device 160 may be any device known to one of ordinary skill in the art for presenting audio content, video content, or any combination thereof, for example, multi-media content.

Figure 2:
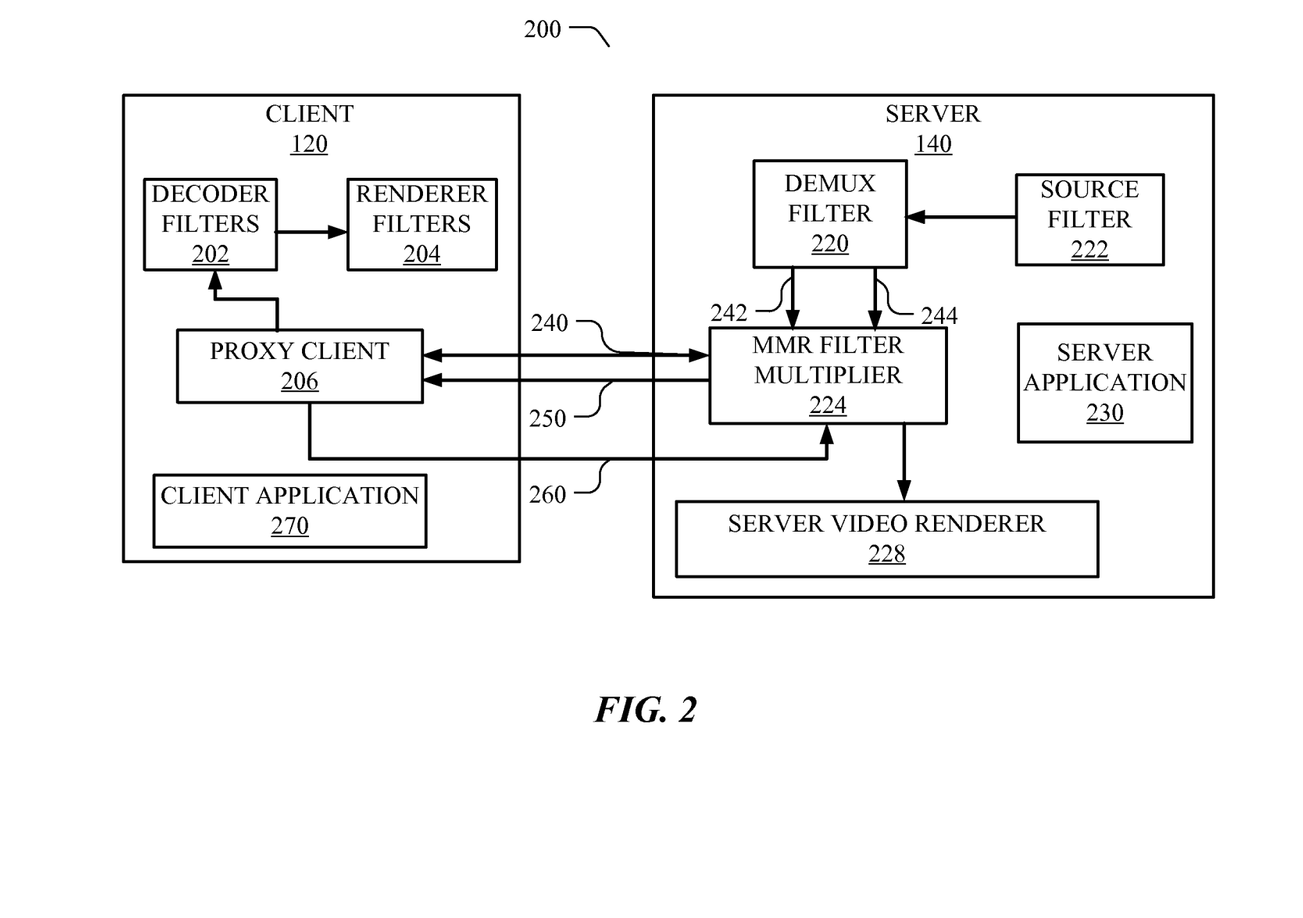
FIG. 2 illustrates an example system of a networked client and server according to one embodiment of the present disclosure.

FIG. 2 at 200 illustrates an example embodiment of a system configured to redirect multi-media content to allow for conferencing in an enterprise environment. For example, a host at server 140 may host a conference by utilizing one or more server applications 230. The conference may be joined by one or more attendees. The one or more attendees may be located at one or more clients 120. While only one client 120 is shown at 200, the present disclosure contemplates any number of clients 120 connected to server 140 via any one or more communications channels. From time to time, the host may request that multi-media content be presented to one or more of the attendees at one or more clients 120. In one embodiment, the environment shown at 200 may satisfy the conferencing requirements requested by the host and the attendees.

Client 200 may include a proxy client 206, decoder filters 202, and renderer filters 204. Decoder filters 202 may include an audio decoder, a video decoder, and any other decoder filter known to one of ordinary skill in the art. Renderer filters 204 may include an audio renderer, a video renderer, or any other renderer filters known to one of ordinary skill in the art. The audio renderer and the video renderer may synchronize with each other. The video renderer of the renderer filters 204 may be used by the client 120 to overlay any video content received. In one embodiment, proxy client 206 may receive multi-media content from multi-media renderer (MMR) filter multiplier 224. The multi-media content may include encoded audio content and encoded video content. The proxy client 206 may split the encoded audio content and video content and send the encoded audio content to an audio decoder of the decoder filters 202 and the encoded video content to a video decoder of the decoder filters 202. The audio decoder decodes the encoded audio content and sends the decoded audio content to an audio renderer of renderer filters 204. The video decoder decodes the encoded video content and sends the decoded video content to a video renderer of renderer filters 204. The renderer filters 204 synchronize the received decoded audio and video content and present this synchronized multi-media content to the client 120 which presents the multi-media content to a user via an appropriate I/O device 160.

Client 120 and server 140 may communicate multi-media content via proxy client 206 and MMR filter multiplier 224 over a network 210 (shown in FIG. 1) via a control channel 240, a media channel 250, a feedback channel 260, or any other channel known to one of ordinary skill in the art. Control channel 240 may be a virtual channel for communicating control information related to a remote conference, such as a UCS/Web conference. In one embodiment, control channel 240 is used by the server 140 to send playback controls for the multi-media content, for example, play, seek, volume, rewind, forward, pause, stop, and any other playback controls known to one of ordinary skill in the art. The client 120 may send to the server 140 via the control channel 240 one or more performance parameters or statistics, for example, network performance. The client 120 may also instruct the server 140 via the control channel 240 to drop samples or packets of the multi-media content when the network 110 has limited available bandwidth.

Media channel 250 may be a websocket or a virtual channel and may be used to communicate multi-media content from MMR filter multiplier 224 to proxy client 206. Media channel 250 may communicate with the MMR filter multiplier 224 using transport control protocol/internet protocol (TCP/IP). In one embodiment Media channel 250 may be a dedicated socket connection. In one or more embodiments, a dedicated socket connection may not be established and the multi-media content may be communicated from the MMR filter multiplier 224 to the proxy client 206 via the control channel 240. For example, proxy client 206 may be configured to receive socket connection information over media channel 250 (or a virtual channel 250) from server 140 or from control channel 240.

Server 140 may include a server video renderer 228. Server video renderer 228 may be used to paint the color-keyed video window on the server. In one embodiment, the color-keyed video window may be painted on the server using the MMR filter multiplier 224.

Server application 230 may be one or more applications that reside locally at the server 140 or may be one or more virtual applications. In one or more embodiments server application 230 may be a web conferencing application and unified communications software (UCS) such as Cisco Unified Computing System (UCS) and Microsoft Lync, CITRIX GoToMeeting, Avaya IP office, Alcatel Open-Touch, and others along with web conferencing software such as TeamViewer, CISCO WEBEX, GoToAssist, LogMeIn, BOMGAR, N24. Server application 230 communicates or synchronizes with a corresponding client application 270 once a client 120 joins a conference hosted at server 140 associated with server application 230.

Server application 230 may request that a multi-media content be presented at one or more clients 120. The multi-media content may be a file, a repository, a tape, a disc, or any other type of storage known to one of ordinary skill in the art. The multi-media content may be in any number of formats, for example, JPEG, H264, MPEG, MP3, MP4, or any other format known to one of ordinary skill in the art. The source filter 222 reads the multi-media content associated with the request from the server application 230 and passes the multi-media content to the demultiplexor (demux) filter 220. The demux filter 220 may be a stream splitter that separates the multi-media content into audio content and video content. The demux filter 220 transmits the separated audio content and video content to the MMR filter 224. The audio content and video content received by the MMR filter 224 remains encoded.

Server 140 is responsible for pushing multi-media content as fast as possible to the client 120. The client 120 may block the medial channel 250 (or control channel 240 when a media channel 250 cannot be established) when the buffer at the client that receives the content is full or no longer accepting data. The buffer may be included within the proxy client 206 or may be communicatively coupled to the proxy client 206. Client 120 notifies the server 140 via a feedback channel 260 that a packet or multi-media content has been dropped or not received. Feedback channel 260 may be a dedicated channel or may be any one or more other communications channels between client 120 and server 140.

Figure 3:
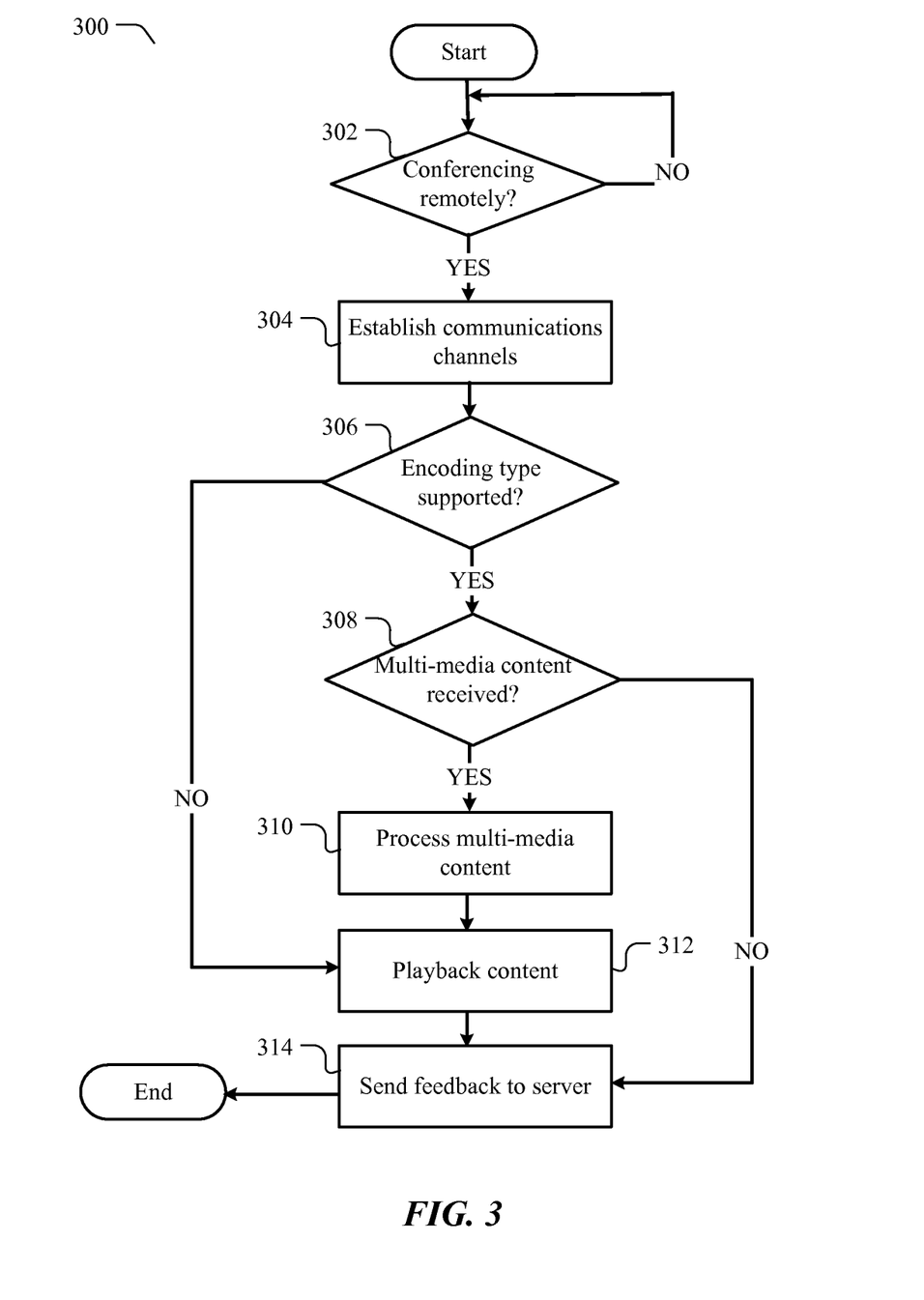
FIG. 3 illustrates an example of steps involved in one method according to one embodiment of the present disclosure.

FIG. 3 is a flow chart in accordance with an embodiment of the present disclosure, shown generally at 300, relating to multi-media redirection. At step 302, the client 120 determines that a conference has been established with server 140. In one embodiment, the client 120 may determine that a conference has been established via a notification from client application 270, by receiving a message from the operating system of server 140, or by any other manner known to one of ordinary skill in the art. In one embodiment, server application 230 initiates a conference with client 120 via negotiations with client application 270. For example, a host may initiate a video-conferencing server application 230 at the server 140. One or more attendees at one or more clients 120 may join the video-conference via a compatible video-conferencing client application 270. If no conferencing has been initiated, the process may wait at step 307. In one embodiment, the process at 300 may not begin until a conference has been established between the client 120 and the server 140.

If a conference has been established then at step 304, one or more communications channels are established between the proxy 206 and the MMR filter multiplier 224 so that any information from the server application 230 may be received by the client application 270 and properly presented at the client 120. For example, the communications between the client 120 and the server 140 may be over a control channel 240, a media channel 250, a feedback channel 160, any other channel known to one of ordinary skill in the art, or any combination thereof. In one embodiment, once the communications channels are established, the server application 230 queries the client application 270 to determine the types of encoding/decoding supported by the client 120. In this way, the server 240 may transmit encoded multi-media content directly to the client 120 using an encoding type recognized by the playback mechanism (or I/O device 160) associated with the client application 270 for playback of multi-media content of the established conference.

Prior to sending the multi-media content, the client 120 may at step 306 receive a query from the server 140 via the control channel 240 (or any other suitable communications channel) requesting the type of encoding supported by the client 120. If the client 120 does not support the type of encoding queried by the server 140, the client 120 will transmit to the server 140 a response indicating that the client 120 does not support the type of encoding queried by the server 140. The server 140 may then transmit to the client 120 rendered multi-media content and the process will proceed to step 312 for playback of the rendered multi-media content. If the client 120 does support the type of encoding queried by the server 140, the client 120 will send a response back to the server 140 indicating that the encoding type queried by the server 140 is supported and the process proceeds to step 308. In one embodiment, the client 120 may respond with a list of all supported encoding types. In another embodiment, the client 120 may respond with an indication of whether are particular encoding type is supported, for example, whether the client 120 supports the encoding type of the multi-media content that the server 140 has been requested by server application 230 to transmit to the client 120.

In one embodiment, a plurality of clients 120 join the conference initiated by the server 240. For example, two or more users at two or more clients 120 may join as attendees a conference hosted by a host at server 140. The server 140 may then query each client 120 to determine the supported encoding types of each client 120 that joined the conference. In one embodiment, a query from the server 140 may be received by the client 120 each time the server 140 attempts to send new multi-media content. In other embodiments, the server 140 may only query the client 120 for the supported type of encoding at the client 120 when the client 120 joins a conference. In such embodiments, it is assumed that the client 120 does not alter supported types of encoding during a conference. The client 120 may also receive a query from the server 140 for the type of encoding supported at the client 120 at any other time and for any other reason known to one of ordinary skill in the art.

At step 308, it is determined if any multi-media content has been received. The server 140 may transmit multi-media content via the MMR filter multiplier 224 to the proxy client 206. The MMR filter multiplier 224 may transmit multi-media content to one or more clients 120 via one or more respective proxy clients 206. The multi-media content may also include one or more playback controls. In one embodiment, the server 140 may transmit one or more playback controls separately from the multi-media content. If multi-media has not been received then the client 120 may continue to step 314. In other embodiments, the process at 300 may wait until multi-media content is received from the server 140.

At step 310, the received multi-media content is processed at the client 120. The proxy client 206 sends the received multi-media content to one or more decoder filters 202. The decoder filters 202 send the decoded multi-media content to one or more renderer filters 204. The renderer filters synchronize the audio and video content of the decoded multi-media content for proper playback.

At step 312 the multi-media content is played back at the client 120. The content may be played back at any type of I/O device 160 for handling multi-media content, for example, television, speakers, monitor (for example, a display-port monitor), information handling system 600, or any other I/O device 160 or combination thereof for playing back multi-media content known to one of ordinary skill in the art.

At step 314, client 120 may transmit via proxy client 206 one or more parameters or statistics that are indicative of performance of the client 120 in processing the redirected multi-media content, network performance, processing performance at the client 120, or any other statistics known to one of ordinary skill in the art. In one embodiment, such feedback is transmitted to the server 140 via a feedback channel 260. In one embodiment, the client 120 may transmit instructions to the server 140 at step 314 to drop one or more samples of the packet or the multi-media content when there is limited available bandwidth. In one or more embodiments the instructions may be indicative of timing associated with the transmission of packets or multi-media content. For example, the client 120 may communicate one or more of how often to transmit, when to transmit (for example, at the occurrence of an event or a specific time), buffer status of the receiving buffer, any other transmission control or feedback parameter known to one of ordinary skill in the art, or any combination thereof. While the process at 300 shows steps 312 and 314 occurring in a certain order, the present disclosure contemplates that any one or more of the steps 312 and 314 may be performed in any appropriate order. For example, steps 312 and 314 may occur at any time during communications between the server 140 and the client 120, may occur in any order, or one or more of the steps 312 and 314 may not be performed.

Figure 4:
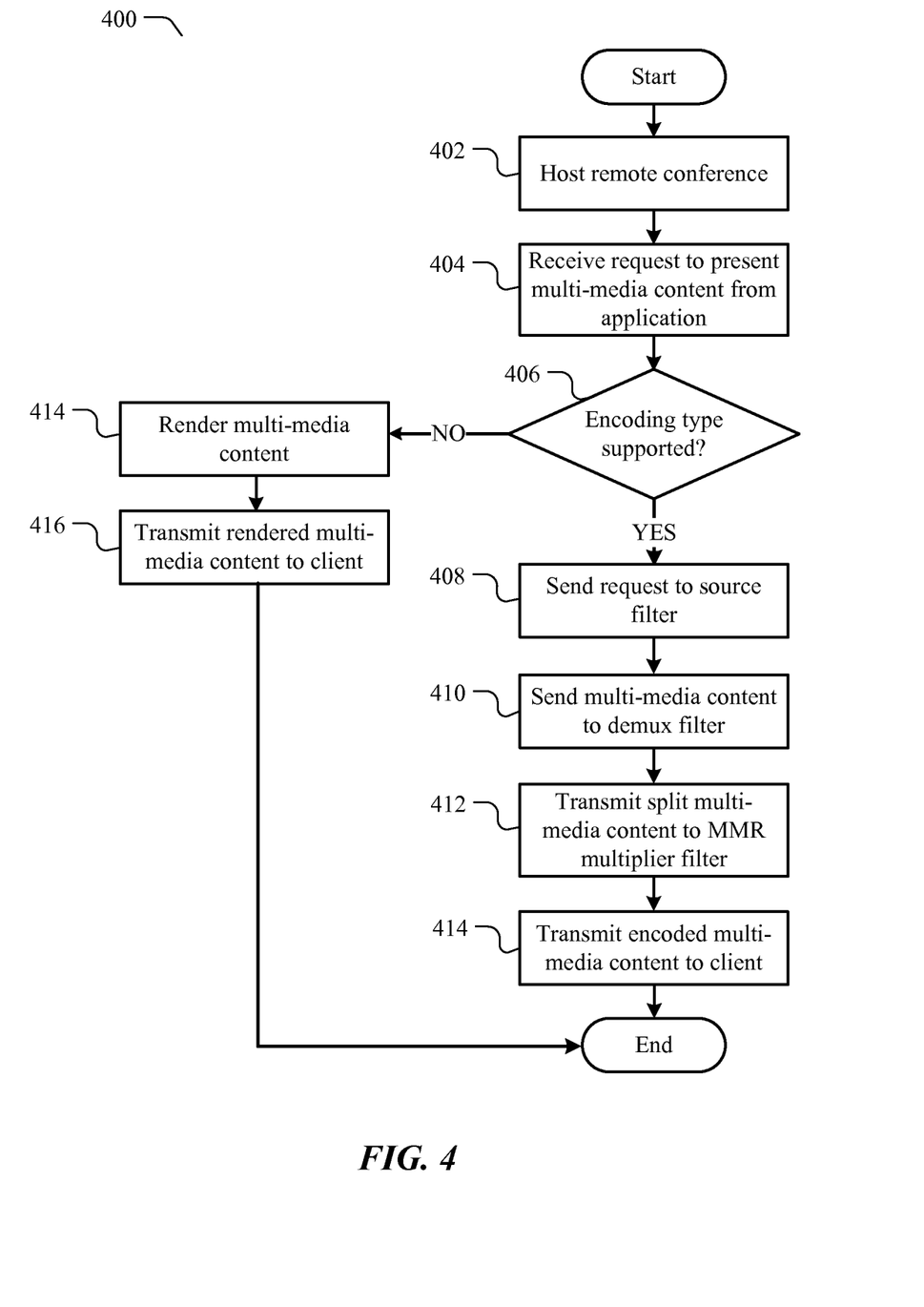
FIG. 4 illustrates an example of steps involved in one method according to one embodiment of the present disclosure.

FIG. 4 is a flow chart in accordance with one embodiment of the present invention shown generally at 400. At step 402, the server 140 initiates a conference or hosts a conference. The conference is accessible to be joined by one or more clients 120. The one or more clients 120 may be remote from the server 140. In one embodiment, when a client 120 attempts to join the conference, a dedicated socket connection is established via media channel 250. In another embodiment, media channel 250 is a virtual channel. Further, in one embodiment if a dedicated socket connection (media channel 250) cannot be established, for example, because of a firewall at the client 120, then the multi-media content may be transmitted via the control channel 240.

At step 404, the server 140 receives a request to present multi-media content from one or more server applications 230. In one embodiment, a server application 230 may request that a multi-media content be presented at one or more clients 120. The multi-media content may be a file, a repository, a tape, a disc, or any other type of storage known to one of ordinary skill in the art. The multi-media content may be in any number of formats, for example, JPEG, H264, MPEG, MP3, MP4, or any other format known to one of ordinary skill in the art. For example, the host of a conference may request that certain multi-media content be presented to the attendees at one or more clients 120.

At step 406, the server 140 queries each client 120 that has been designated to receive the multi-media content. For example, the server application 230 may request that all clients 120 that have joined the conference receive the multi-media content. In another example, the server application 230 may request that only certain clients 120 that have one or more credentials should receive the multi-media content. The type of credentials may include, but are not limited to, type of user associated with client 120, type of client 120, type of connection, network bandwidth, location of the client 120, and any other credentials known to one of ordinary skill in the art. The server 140 may store the supported type of encoding response from the client 120. The response may be stored in a database, a flat-file, a linked list, a table, or any other type of storage known to one of ordinary skill in the art. The query from server 140 may be a request for all encoding types supported by the client 120, whether the client 120 supports a particular encoding type (for example, the encoding type of the multi-media content), or any other suitable request known to one of ordinary skill in the art. If the encoding type of the multi-media content is not supported by the client 120, the server 140 will render the multi-media content at step 414 and then at step 416 transmit the rendered multi-media content to the client 120.

If the encoding type of the multi-media content is supported by the client 120, then at step 408, the request is sent to the source filter 222 which reads or loads the requested multi-media content. The operating system of the server 140 may instruct the source filter 222 to read the multi-media content associated with the request from the server application 230. At step 410, the multi-media content is transmitted to the demux filter 220 where the multi-media content is split into audio content and video content. At step 412, the demux filter 220 transmits the split multi-media content to MMR filter multiplier 224. At step 414, the multi-media content (still encoded in the original encoding format) is redirected to the one or more clients 120. In one embodiment, at step 414, the MMR filter multiplier 224 transmits to the client 120 the encoded multi-media content stream that includes the split audio content and the video content. In one embodiment, the audio content and video content are sent as separate streams. The multi-media content stream may be transmitted to one or more clients 120 via media channel 250 or control channel 240.

Figure 5:
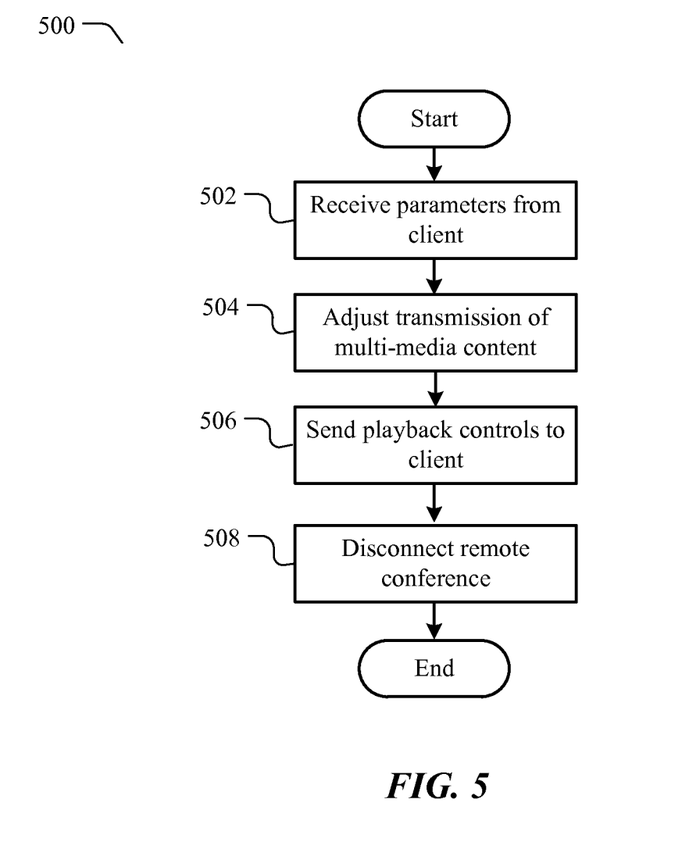
FIG. 5 illustrates transaction requests between a client and server according to one embodiment of the present disclosure.

FIG. 5 is a flow chart in accordance with one embodiment of the present invention shown generally at 500. At step 502, the server 140 receives one or more parameters from the client 120. In one embodiment, the one or more parameters may include one or more feedback parameters indicative of a dropped packet, a corrupted packet, or any other loss of packet feedback known to one of ordinary skill in the art via a feedback channel 260. In one embodiment, the one or more parameters may be indicative of network performance and may be received via control channel 240. A parameter indicative of network performance may indicate the bandwidth of the network or that the server 140 should drop transmission of some packets or increase transmission of packets due to available bandwidth. At step 504, the server 140 adjusts the transmission of the multi-media content, based, at least in part on one or more of the received one or more parameters. At step 506, the server 140 sends one or more playback controls to the client 120. The playback controls may be any one or more controls that a presenter of the remote conference requires for the presentations of the multi-media content. For example, playback controls may include play, pause, stop, fast-forward, rewind, frame-by-frame playback, volume control, or any other playback controls known to one of ordinary skill in the art.

While the process at 500 shows steps 506 and 508 following steps 502 and 504, the present disclosure contemplates that any one or more of the steps shown in FIG. 5 may be performed in any appropriate order such that steps 506 and 508 may be performed before steps 502 and 504 and that any one or more steps may not be performed.

Figure 6:
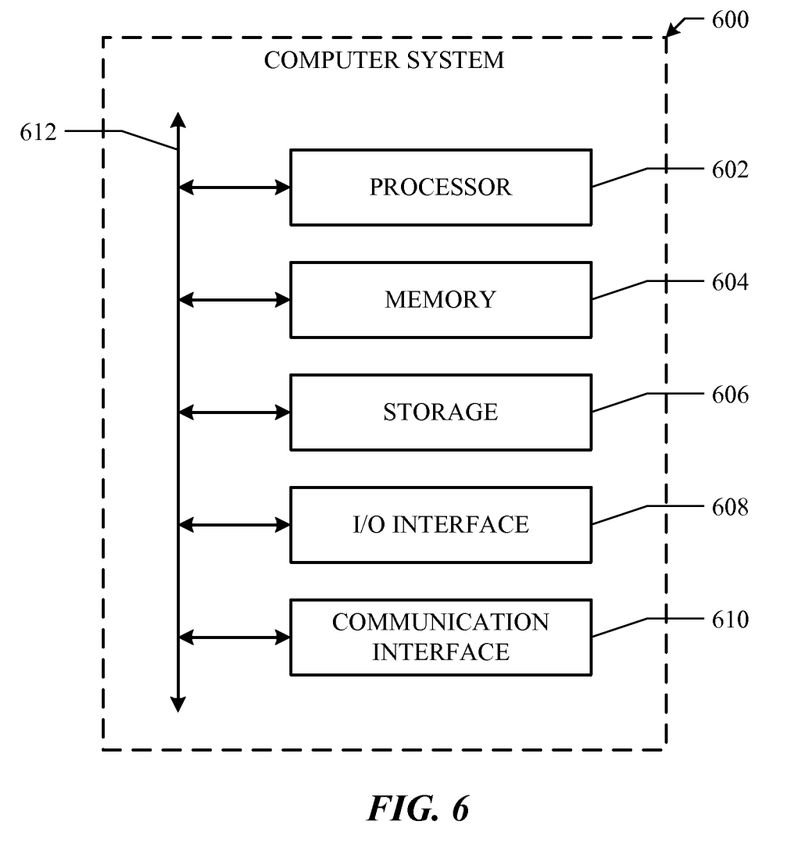
FIG. 6 illustrates an example computing system.

Particular embodiments may be implemented on one or more electronic devices or information handling systems. FIG. 6 illustrates an example information handling system, computer system 600. For example, computer system 600 may be an embodiment for a device that runs a user interface content editor. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an I/O interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. The instructions may be part of one or more modules. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard-disk drive (HDD), a floppy disk drive, flash memory, an optical disc, a magneto-optical disc, magnetic tape, or a USB drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Those of skill in the art would appreciate that items such as the various illustrative blocks, modules, elements, components, methods, operations, steps, and algorithms described herein may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (for example, one or more of blocks, modules, elements, components or processors) for performing one or more functions or operations. In one aspect, such an item may be an apparatus, hardware, or a portion thereof. In one example, an item may have a structure in the form of, for example, an instruction(s) encoded or stored on a machine-readable medium, on another device, or on a portion thereof. An instruction(s) may be software, an application(s), a subroutine(s), or a portion thereof. The instructions(s) may be for performing the function(s) or operation(s). The instruction(s) may be executable by one or more processors to perform the function(s) or operation(s). One or more processors may execute the instruction(s) by, for example, transferring or copying and instructions into an executable memory space and executing the instructions. In one example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (for example, a digital signal processor (DSP), an application specific integrated circuit (ASIC), a field programmable gate array (FPGA), etc.), as a portion(s) of any of the foregoing, or as a combination(s) of any of the foregoing. Those skilled in the art will recognize how to implement the instructions, circuits, and processing systems.

In one aspect of the disclosure, when actions or functions (for example, hooking, modifying, intercepting, redirecting, determining, traversing, obtaining, creating, operating, deleting, removing, receiving, providing, generating, converting, displaying, notifying, accepting, selecting, controlling, transmitting, reporting, sending, or any other action or function) are described as being performed by an item (for example, one or more of blocks, modules, elements, components or processors), it is understood that such actions or functions may be performed, for example, by the item directly. In another example, when an item is described as performing an action, the item may be understood to perform the action indirectly, for example, by facilitating such an action (for example, assisting, allowing, enabling, causing, or providing for, such action to occur; or performing a portion of such an action). For example, determining can refer to facilitating determination, attaching can refer to facilitating attaching, and receiving can refer to facilitating receiving. In one aspect, performing an action may refer to performing a portion of the action (for example, performing a beginning part of the action, performing an end part of the action, or performing a middle portion of the action).

A reference to an element in the singular is not intended to mean "one and only one" unless specifically so stated, but rather "one or more." For example, a client may refer to one or more clients, a server may refer to one or more servers, an operation may refer to one or more operations, and a signal, message, or communication may refer to one or more signals, messages, or communications.

Unless specifically stated otherwise, the term "some" refers to one or more. Pronouns in the masculine (for example, his) include the feminine and neuter gender (for example, her and its) and vice versa. Headings and subheadings, if any, are used for convenience only and do not limit the invention.

A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, the term "coupled" or the like may refer to being directly coupled. In another aspect, the term "coupled" or the like may refer to being indirectly coupled or communicatively coupled.

Various items may be arranged differently (for example, arranged in a different order, or partitioned in a different way) all without departing from the scope of the subject technology. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
hosting a remote conference by a server;
receiving a request by a multi-media redirection multiplier filter of the server from a proxy client of a client to establish one or more communications channels, wherein the client is remote from the server;
establishing, by the server, at least one of the one or more communications channels with the client;
receiving, by the server, a request to present multi-media content to the client from an application, wherein the application is one of a local application or a virtual application associated with the server;
synchronizing, by the application, with a corresponding client application once the client joins the remote conference;
querying, by the server, the client for a type of encoding supported by the client;
loading, by a source filter of the server, the multi-media content from the application;
passing, by the source filter, the multi-media content to a demultiplexor of the server;
splitting, by the demultiplexor, the multi-media content loaded by the source filter into at least one of audio content and video content;
transmitting, by the demultiplexor, the at least one of audio content and video content to the multi-media redirection multiplier filter, wherein the at least one of audio content and video content remains encoded in an original encoding;
redirecting, by the server, the at least one of audio content and video content to the client via the multi-media redirection multiplier filter, wherein the audio content and the video content are still encoded in the original encoding;
sending one or more playback controls to the client via the at least one of the one or more communications channels; and
receiving one or more performance parameters from the client via the one or more communications channels.

2. The method of claim 1, wherein the one or more communications channels comprise media channel, a control channel, and a feedback channel.

3. The method of claim 1, further comprising:
receiving one or more parameters from the client; and
adjusting transmission of the at least one of audio content and video content to the client based, at least in part, on the one or more parameters.

4. The method of claim 1, further comprising:
receiving one or more feedback parameters from the client via a feedback channel;
dropping one or more packets associated with the at least one of the audio content and the video content based, at least in part, on the one or more feedback parameters.

5. The method of claim 1, wherein the demultiplexor comprises a stream splitter.

6. The method of claim 1, further comprising:
establishing a control channel; and
sending one or more control parameters to the client via the control channel.

7. The method of claim 6, further comprising:
establishing a media channel, wherein the media channel is a dedicated channel, and wherein the at least one of audio content and video content is redirected to the client via the media channel.

8. A system comprising:
a server;
one or more processors for processing information of the server;
a memory of the server communicatively coupled to the one or more processors; and
one or more modules that comprise instructions stored in the memory, the instructions, when executed by the one or more processors, operable to perform operations comprising:
hosting, by the server, a remote conference;
receiving a request, by a multi-media redirection multiplier filter of the server, from a proxy client of a client to establish one or more communications channels, wherein the client is remote from the server;
establishing, by the server, at least one of the one or more communications channels with the client;
receiving, by the server, a request to present multi-media content to the client from an application, wherein the application is one of a local application or a virtual application associated with the server;
synchronizing by the application with a corresponding client application once the client joins the remote conference;
querying, by the server, the client for a type of encoding supported by the client;
loading, by a source filter of the server, the multi-media content from the application;
passing, by the source filter, the multi-media content to a demultiplexor of the server;
splitting, by the demultiplexor, the multi-media content loaded by the source filter into at least one of audio content and video content;
transmitting, by the demultiplexor the at least one of audio content and video content to the multi-media redirection multiplier filter, wherein the at least one of audio content and video content remains encoded in an original encoding;
redirecting, by the server, the at least one of audio content and video content to the client via the multi-media redirection multiplier filter, wherein the audio content and the video content are still encoded in the original encoding;
sending one or more playback controls to the client via the at least one of the one or more communications channels; and
receiving one or more performance parameters from the client via the one or more communications channels.

9. The system of claim 8, wherein the one or more communications channels comprise a media channel, a control channel, and a feedback channel.

10. The system of claim 8, wherein the instructions further operable to perform operations comprising:
receiving one or more parameters from the client; and
adjusting transmission of the at least one of audio content and video content to the client based, at least in part, on the one or more parameters.

11. The system of claim 8, wherein the instructions further operable to perform operations comprising:

receiving one or more feedback parameters from the client via a feedback channel;

dropping one or more packets associated with the at least one of the audio content and the video content based, at least in part, on the one or more feedback parameters.

12. The system of claim 8, wherein the demultiplexor comprises a stream splitter.

13. The system of claim 8, wherein the instructions further operable to perform operations comprising:

establishing a control channel; and sending one or more control parameters to the client via the control channel.

14. The system of claim 8, wherein the instructions further operable to perform operations comprising:

establishing a media channel, wherein the media channel is a dedicated channel, and wherein the at least one of audio content and video content is redirected to the client via the media channel.

15. One or more computer-readable non-transitory storage media embodying software operable when executed by one or more information handling systems to:

host, by an information handling system of the one or more information handling systems, a remote conference;

receive, by a multi-media redirection multiplier filter of the information handling system, a request from a proxy client of a client to establish one or more communications channels, wherein the client is remote from the information handling system;

establish, by the information handling system, at least one of the one or more communications channels with the client;

receive, by the information handling system, a request to present multi-media content to the client from an application, wherein the application is one of a local application or a virtual application associated with the server;

synchronize by the application with a corresponding client application once the client joins the remote conference;

query, by the server, the client for a type of encoding supported by the client;

load, by a source filter of the information handling system, the multi-media content from the application;

passing, by the source filter, the multi-media content to a demultiplexor of the information handling system;

split, by the demultiplexor the multi-media content loaded by the source filter into at least one of audio content and video content;

transmit, by the demultiplexor, the at least one of audio content and video content to the multi-media redirection multiplier filter, wherein the at least one of audio content and video content remains encoded in an original encoding;

redirect by the information handling system the at least one of audio content and video content to the client via the multi-media redirection multiplier filter, wherein the audio content and the video content are still encoded in the original encoding;

send one or more playback controls to the client via the at least one of the one or more communications channels; and receive one or more performance parameters from the client via the one or more communications channel.

16. The media of claim 15, wherein the one or more communications channels comprise a media channel, a control channel, and a feedback channel.

17. The media of claim 15, wherein the software is further operable when executed to:

receive one or more parameters from the client; and adjust transmission of the at least one of audio content and video content to the client based, at least in part, on the one or more parameters.

18. The media of claim 15, wherein the software is further operable when executed to:

receive one or more feedback parameters from the client via a feedback channel;

drop one or more packets associated with the at least one of the audio content and the video content based, at least in part, on the one or more feedback parameters.

19. The media of claim 15, wherein the software is further operable when executed to:

establishing a control channel; and sending one or more control parameters to the client via the control channel.

20. The media of claim 15, wherein the software is further operable when executed to:

establishing a media channel, wherein the media channel is a dedicated channel, and wherein the at least one of audio content and video content is redirected to the client via the media channel.

* * * * *